(12) United States Patent
Shrivastava (10) Patent No.: US 11,482,007 B2
(45) Date of Patent: Oct. 25, 2022

(54) EVENT-BASED VEHICLE POSE ESTIMATION USING MONOCHROMATIC IMAGING

(71) Applicant: Ford Global Technologies, LLC, Dearborn, MI (US)

(72) Inventor: Shubham Shrivastava, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 94 days.

(21) Appl. No.: 17/172,631

(22) Filed: Feb. 10, 2021

(65) Prior Publication Data

US 2022/0253634 A1 Aug. 11, 2022

(51) Int. Cl.
*G06V 20/54* (2022.01)
*G06T 7/207* (2017.01)
(Continued)

(52) U.S. Cl.
CPC ............ *G06V 20/54* (2022.01); *G06T 7/207* (2017.01); *G06T 7/62* (2017.01); *G06T 7/70* (2017.01); *G06V 10/56* (2022.01); *G06V 10/758* (2022.01); *G06T 2207/10024* (2013.01); *G06T 2207/30244* (2013.01); *G06T 2207/30252* (2013.01); *G06V 2201/08* (2022.01)

(58) Field of Classification Search
CPC ...... G06V 20/54; G06V 10/56; G06V 10/758; G06V 2201/08; G06T 7/207; G06T 7/62; G06T 7/70; G06T 2207/10024; G06T 2207/30244; G06T 2207/30252

USPC ......................................................... 382/103
See application file for complete search history.

(56) References Cited

U.S. PATENT DOCUMENTS 9,727,793 B2 8/2017 Heisele et al.
9,864,927 B2 * 1/2018 McManus .............. G06V 20/56
(Continued)

FOREIGN PATENT DOCUMENTS

CN 109948661 A 6/2019

OTHER PUBLICATIONS

Hao Lyu, "Automatic Vehicle Detection and Identification Using Visual Features," Electronic Theses and Dissertations, 7378, 2018, 84 pgs., Windsor, CA.
(Continued)

*Primary Examiner* — Ali Bayat
(74) *Attorney, Agent, or Firm* — Brandon Hicks; Eversheds Sutherland (US) LLP (57) ABSTRACT

A computer-implemented method for estimating a vehicle pose for a moving vehicle is described includes obtaining, via a processor disposed in communication with a monochromatic camera, a monochromatic image of an operating environment, and detecting in the monochromatic image an event patch showing a plurality of pixels associated with the moving vehicle. The method further includes generating an optical flow map using an unsupervised optical flow prediction network to predict an optical flow for each pixel in the monochromatic image. The optical flow map includes a Red-Green-Blue (RGB) patch having color information associated with a velocity for the moving vehicle. The system generates a pixel-level event mask that includes the RGB patch, and estimates the vehicle pose for the moving vehicle.

20 Claims, 8 Drawing Sheets

(51) Int. Cl.
G06T 7/70 (2017.01)
G06T 7/62 (2017.01)
G06V 10/56 (2022.01)
G06V 10/75 (2022.01)

(56) References Cited

U.S. PATENT DOCUMENTS

| | | | |
|---|---|---|---|
| 2016/0065903 A1* | 3/2016 | Wang | H04N 7/181 |
| | | | 348/148 |
| 2020/0172110 A1* | 6/2020 | Uemori | G01J 5/10 |
| 2021/0190535 A1* | 6/2021 | Tomioka | G05D 1/0246 |
| 2022/0117214 A1* | 4/2022 | Garner | A01M 9/0092 |
| 2022/0118555 A1* | 4/2022 | Sibley | B23K 26/361 |

OTHER PUBLICATIONS

S. Yu et al., "Vehicle Detection and Localization on Bird's Eye View Elevation Images Using Convolutional Neural Network," IEEE International Symposium on Safety, Security and Rescue Robotics (SSRR), Oct. 2017, 8 pgs., Shanghai, CN.

* cited by examiner

EVENT-BASED VEHICLE POSE ESTIMATION USING MONOCHROMATIC IMAGING

TECHNICAL FIELD

The present disclosure relates to computer driven vehicle pose estimation, and more particularly, to event-based vehicle pose estimation using monochromatic imaging.

BACKGROUND

In enclosed spaces such as parking garages, accurate detection and localization of vehicles are imperative for terminal traffic control and other applications where a centralized terminal localizes and routes vehicle traffic. Such localization will be particularly important when autonomous vehicles are commonplace. One problem in traffic management is signal transmission in closed spaces like parking garages. Accurate position, dimensions, and orientation of the vehicle are needed to correctly route the vehicles inside tight indoor spaces. In many structure interiors, Global Positioning System (GPS) signals are often unreceivable and cannot provide usable vehicle localization information. This is problematic because accurate detection and localization of vehicles are imperative for applications such as terminal traffic control where the terminal localizes and routes the vehicles to stations.

Some conventional localization systems may use sensory systems that include RGB cameras, LiDAR, or other sensory equipment to identify moving objects as vehicles, and provide pose estimation that orients the detected objects and tracks vehicle trajectories. Sensor-based approaches to vehicle pose estimation are often costly due to the need for multiple sophisticated cameras and sensors.

Continuously trying to detect vehicles is power consuming and ineffective when garage traffic flow is very low. Other design approaches have included integrating sensors in the vehicles instead of mounting cameras in the garage interior space. Such implementations may be cost prohibitive, and may not be usable for long periods at times where the vehicle is parked for extended periods, because the camera systems are always recording and using battery resources. Reduced energy camera-based systems that use monochromatic cameras have also been considered, but with existing monochromatic camera-based detection methods, vehicles at a farther distance with respect to the camera location cannot be accurately detected and localized in a world coordinate system.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Illustrative Embodiments

The disclosure will be described more fully hereinafter with reference to the accompanying drawings, in which example embodiments of the disclosure are shown, and not intended to be limiting.

Figure 1:
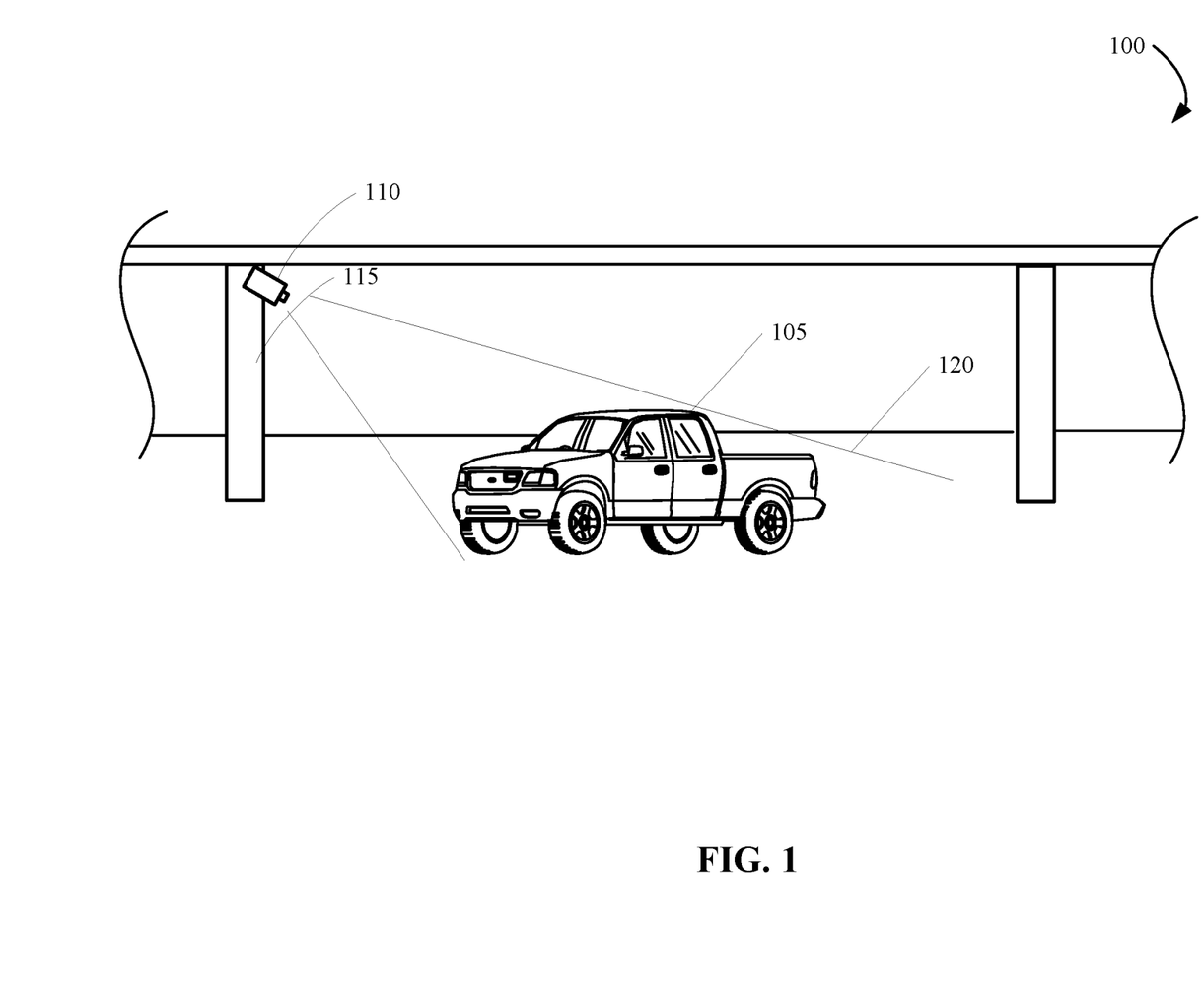
FIG. 1 depicts an example environment in which techniques and structures for providing the systems and methods disclosed herein may be implemented.

FIG. 1 depicts an example environment in which techniques and structures for providing the systems and methods disclosed herein may be implemented. One of the major problems in traffic management is closed spaces. FIG. 1 depicts an example garage-like space 100 in which a vehicle 105 in which a vehicle 105 may operate. In a garage-like space, GPS often is not functional and cannot provide vehicle localization information that may be usable to control stations for managing traffic inside of the closed environment. The difficulty of sending and receiving signals from these closed spaces is problematic because accurate detection and localization of the vehicle 105 can be imperative for applications such as terminal traffic control, where a terminal localizes and routes the vehicle 105 to a station (not shown in FIG. 1) for parking, services such as recharging, maintenance, pickup/dropoff, etc. Some conventional localization systems may use sensory systems that can include RGB cameras, LiDAR, and other sensory equipment to identify moving objects as vehicles, provide pose estimation for orienting the detected objects and tracking trajectory. Such sensory approaches to vehicle pose estimation is costly due to the need for multiple cameras and sensors, as they are typically disposed at multiple viewing points inside of the closed space.

As shown in FIG. 1, a monochromatic camera 110 may be disposed at one or more viewing locations to capture images of vehicles operating within a field of view 120 of the monochromatic camera 110. Some conventional localization systems may use sensory systems that can include RGB cameras, LiDAR, and other sensory equipment to identify moving objects as vehicles, provide pose estimation for orienting the detected objects and tracking trajectory. Such sensory approaches to vehicle pose estimation may be costly due to the need for multiple cameras and sensors, as they are typically disposed at multiple viewing points inside of the closed space. According to one embodiment, as shown in FIG. 1, the monochromatic camera 110 may be a monochromatic camera operating as part of an event-based vehicle pose estimation system 300 (as shown in FIG. 3).

The monochromatic camera 110 may be statically mounted on a surface 115. Instead of continuously detecting moving objects and vehicles in the operating environment 100, the monochromatic camera 110 may detect vehicles only when moment is detected in the field of view 120. The system (e.g., the event detection system 300) may perform an event detection system and generate an optical flow map responsive to determining that a vehicle (e.g., the vehicle 105) is operating in the operation environment 100. An event as used herein may include an object moving within the field of view 120 of the monochromatic camera 110.

Figure 2:
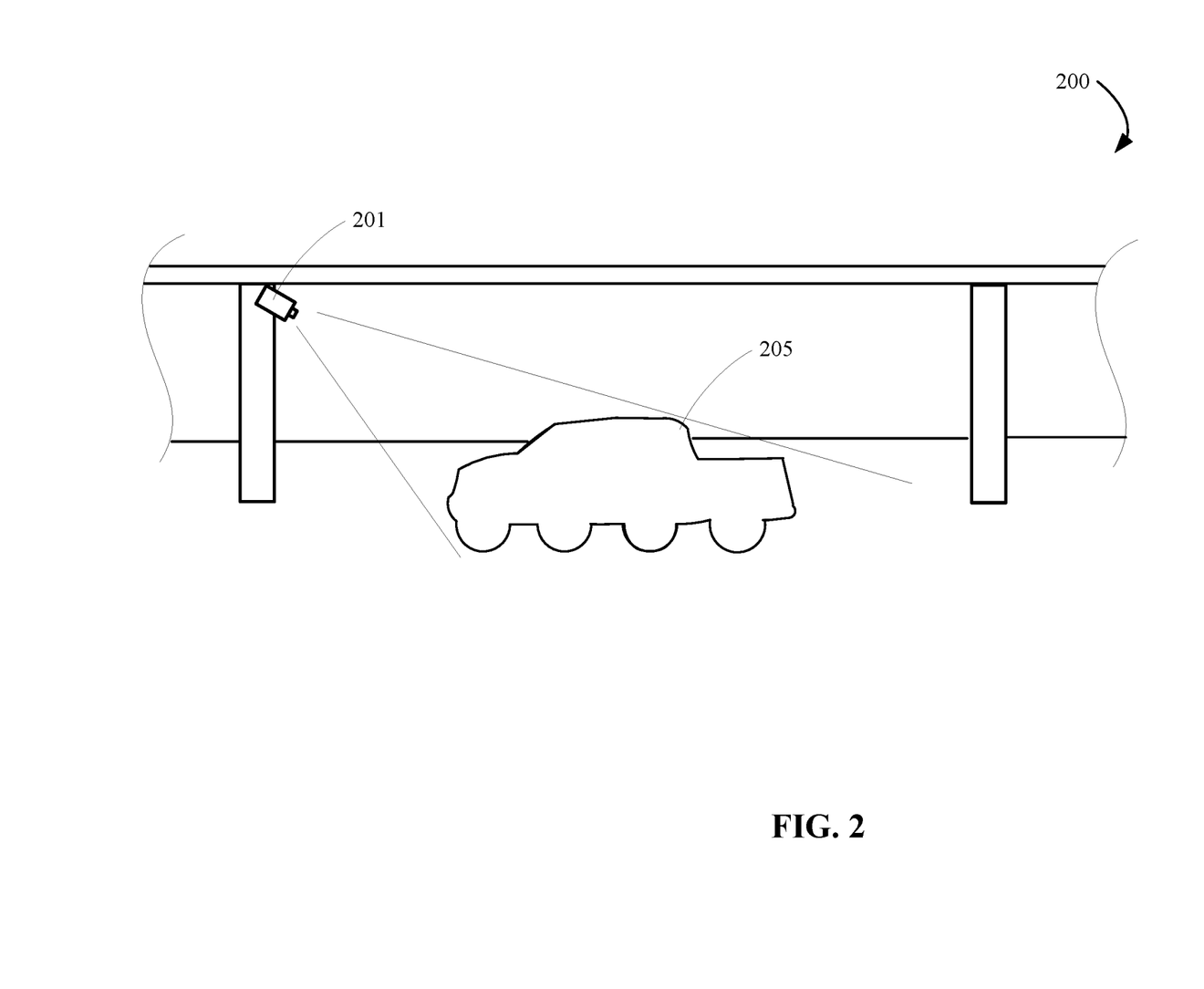
FIG. 2 illustrates an example optical flow map from an unsupervised optical flow prediction network in accordance with the present disclosure.
Figure 3:
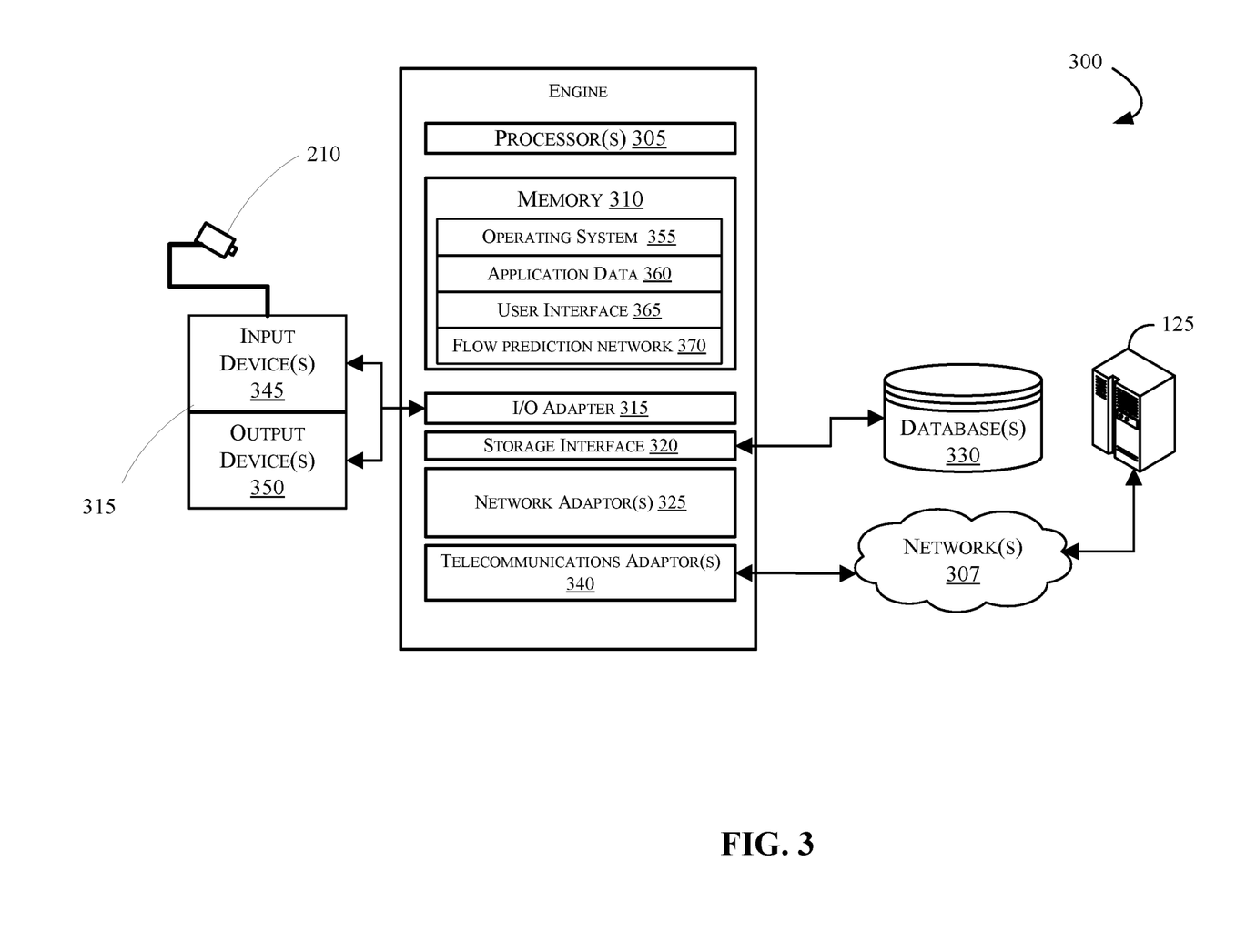
FIG. 3 illustrates a block diagram of an example computing system for operating the unsupervised optical flow prediction network in accordance with the present disclosure.
Figure 4:
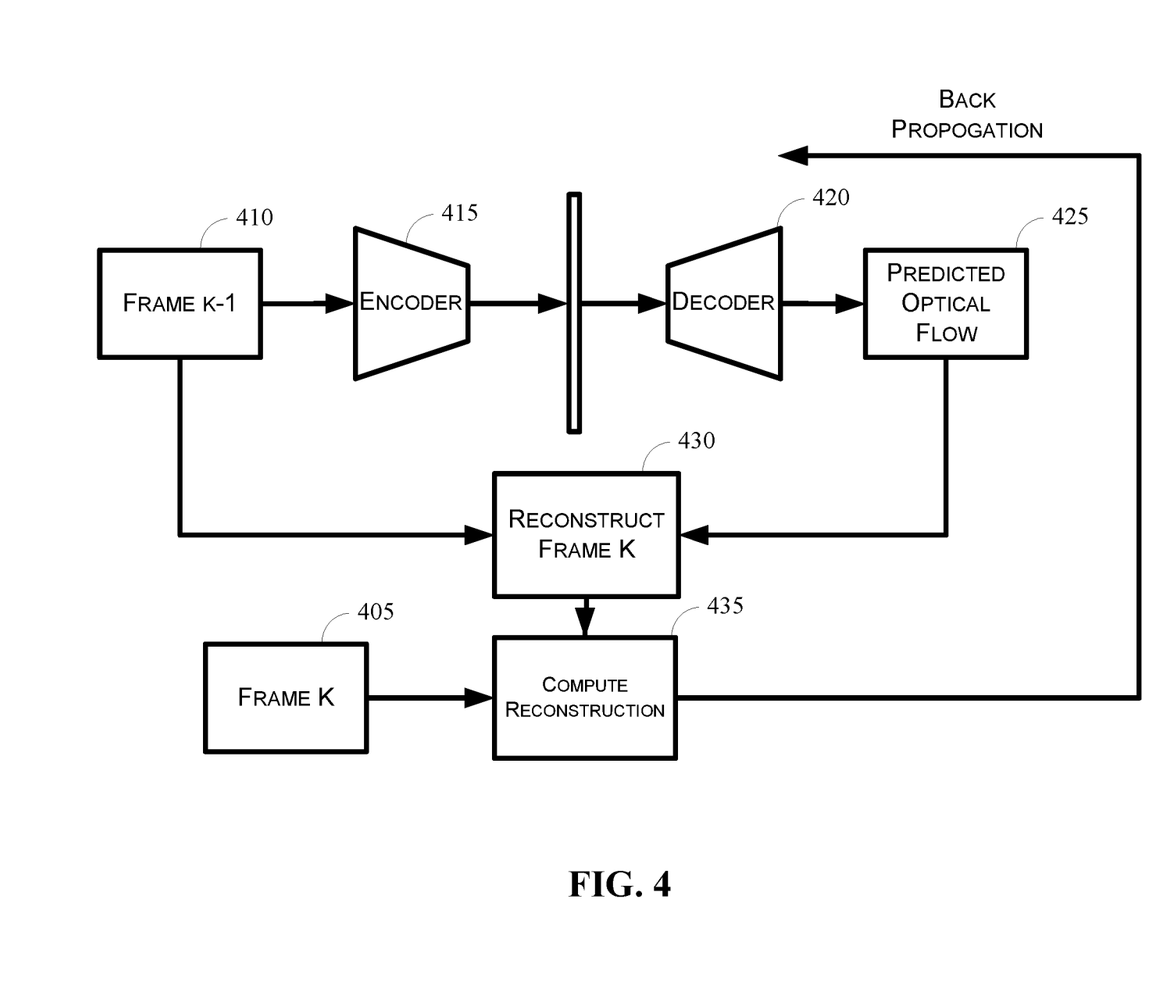
FIG. 4 depicts a block diagram of the unsupervised optical flow prediction network of FIG. 3 in accordance with the present disclosure.

FIG. 2 illustrates an example event mask view 200, generated by an unsupervised optical flow prediction network (e.g., the unsupervised flow prediction network 370 as shown with respect to FIG. 3) operating as part of the event detection system 300, in accordance with the present disclosure. Responsive to detecting a moving object within the field of view 120, the flow prediction network 370 may generate an event masked view 205 that can include a masked view of the vehicle 105. The masked view 205 may be a blob of pixels comprising a volume or shape representing the vehicle 105. The masked view 205 may be used to produce an event map (referred to herein as an event mask) as shown in FIG. 4.

Before discussing the event mask in greater detail, a short introduction to the system 300 is described in the following section. FIG. 3 illustrates a block diagram of an exemplary event detection system 300 (hereafter "system 300"), for use in practicing the embodiments described herein. The system 300, as described herein, can be implemented in hardware, software (e.g., firmware), or a combination thereof.

As shown in FIG. 3, the system 300 may include the one or more processor(s) 305, a memory 310 communicatively coupled to the one or more processor(s) 305, and one or more input/output adapters 315 that can communicatively connect with external devices. The input/output adapters 315 may include, for example, the monochromatic camera 210.

The monochromatic camera 210 may be and/or include one or more digital sensors that do not include a color filter array. Thus, the monochromatic camera 210 may record all the light that falls on each pixel. Because none of the light is lost to color filters, the monochromatic camera 210 sensor sensitivity may be higher than the sensitivity of a similar red-green-blue (RGB) camera sensor system, while consuming less power for operation.

The input/output adapters 315 may operatively connect to and communicate information with one or more internal and/or external memory devices storing one or more database(s) via a storage interface 320. In one example embodiment, the database(s) may include one or more database(s) 330 that can include vehicle characteristics described hereafter with respect to FIG. 7.

The system 300 may include one or more network communications adapter(s) 325 enabled to communicatively connect the system 300 with one or more networks 307. In some example embodiments, the network(s) 307 may be or include a telecommunications network infrastructure, which may connect a mobile device (not shown) or other device such as a wireless camera with the server(s) 125. In such embodiments, the system 300 can further include one or more communications adaptor(s) 340. The system 300 may further include and/or connect with one or more input devices 345 and/or one or more output devices 350 through the I/O adapter(s) 315.

The one or more processor(s) 305 are collectively a hardware device for executing program instructions (aka software), stored in a computer-readable memory (e.g., the memory 310). The one or more processor(s) 305 can be a custom made or commercially available processor, a central processing unit (CPU), a plurality of CPUs, an auxiliary processor among several other processors associated with the server(s) 125, a semiconductor-based microprocessor (in the form of a microchip or chip set), or generally any device for executing instructions.

The one or more processor(s) 305 may be disposed in communication with one or more memory devices (e.g., the memory 310 and/or one or more external database(s) 330, etc.) via a storage interface 320. The storage interface 320 can also connect to one or more memory devices including, without limitation, one or more database(s) 330, and/or one or more other memory drives (not shown in FIG. 2) including, for example, a removable disc drive, a vehicle computing system memory, cloud storage, etc., employing connection protocols such as serial advanced technology attachment (SATA), integrated drive electronics (IDE), universal serial bus (USB), fiber channel, small computer systems interface (SCSI), etc.

The memory 310 can include any one or a combination of volatile memory elements (e.g., dynamic random-access memory (DRAM), synchronous dynamic random access memory (SDRAM), etc.) and can include any one or more nonvolatile memory elements (e.g., erasable programmable read only memory (EPROM), flash memory, electronically erasable programmable read only memory (EEPROM), programmable read only memory (PROM), etc.

The instructions in the memory 310 can include one or more separate programs, each of which can include an ordered listing of computer-executable instructions for implementing logical functions. In the example of FIG. 3, the instructions in the memory 310 can include an operating system 355. The operating system 355 can control the execution of other computer programs such as, for example, instantiation of a vehicle model and roll-pitch-yaw prediction network, instantiation of an unsupervised optical flow prediction network, and/or terminal traffic control applications that use vehicle pose information to control traffic in the operating environment 100.

In one example embodiment, the processor(s) 305 may obtain a monochromatic image (not shown in FIG. 3) of the operating environment 100, detect an event patch that includes a plurality of pixels associated with the moving vehicle 105, generate an optical flow map to predict an optical flow for each pixel in the monochromatic image, and generate, based on the optical flow map, a pixel-level event mask comprising a Red-Green-Blue (RGB) patch. The system 300 may estimate a vehicle pose for the moving vehicle 105 using the optical flow using a flow prediction network 370.

The program instructions stored in the memory 310 can further include application data 360, and instructions for controlling and/or interacting with the system 300 through a user interface 365.

The I/O adapter 315 can connect a plurality of input devices 345 to the server(s) 125. The input devices can include, for example, a keyboard, a mouse, a microphone, a sensor, etc. The output device 350 can include, for example, a display, a speaker, a touchscreen, etc.

The I/O adapter 315 can further include a display adapter coupled to one or more displays. The I/O adapter 315 can be configured to operatively connect one or more input/output (I/O) devices 350 to the server(s) 125. For example, the I/O adapter 315 can connect a keyboard and mouse, a touchscreen, a speaker, a haptic output device, or other output device. The output devices 350 can include but are not limited to a printer, a scanner, and/or the like. Other output devices can also be included, although not shown in FIG. 3. Finally, the I/O devices connectable to the I/O adapter 315 can further include devices that communicate both inputs and outputs, for instance but are not limited to, a network interface card (NIC) or modulator/demodulator (for accessing other files, devices, systems, or a network), a radio frequency (RF) or other transceiver, a telephonic interface, a bridge, a router, and the like.

According to some example embodiments, the server(s) 125 can include a mobile communications adapter 340. The mobile communications adapter 340 can include global positioning system (GPS), cellular, mobile, and/or other communications protocols for wireless communication. It should be appreciated that the GPS may, in some embodiments where the operating environment 100 may not be in an enclosed space, provide coordinates for localization of the vehicle 105.

In some embodiments, the server(s) 125 can further include a communications adapter 340 for coupling to the one or more network(s) 307. The network(s) 307 can be and/or include Internet protocol (IP)-based network(s) for communication between the server(s) 125 and any external device. The network(s) 307 may transmit and receive data between the server(s) 125 and devices and/or systems external to the server(s) 125. In an exemplary embodiment, the network(s) 307 can be a managed IP network administered by a service provider. The network(s) 307 can be implemented in a wireless fashion, e.g., using wireless protocols and technologies, such as Wi-Fi, WiMAX, etc. The network(s) 307 can also connect with and/or include a wired network, e.g., an Ethernet network, a controller area network (CAN), etc., having any wired connectivity including, e.g., an RS232 connection, etc. The network(s) 307 can also be and/or include a packet-switched network such as a local area network, wide area network, metropolitan area network, the Internet, or other similar type of network environment. The network(s) 307 can be a fixed wireless network, a wireless local area network (LAN), a wireless wide area network (WAN) a personal area network (PAN), a virtual private network (VPN), intranet or another suitable network system.

FIG. 4 depicts a block diagram of the unsupervised optical flow prediction network 400 ("network 400") in accordance with the present disclosure. The network 400 can include a frame k 405 and a previous frame k−1 410, an encoder 415, a decoder 420, a predicted optical flow map 425, a reconstruction error compute block 430, and a reconstruction computer error block 435. The frame k 405 may include a frame of the field of view 120 as shown in FIG. 1. The frame k therefore may include a plurality of pixels representing a monochromatic image of the vehicle 105 as the vehicle moves into and through the field of view 120. The frame K−1 illustrates a representation of the previous frame subsequent to the frame K 405. It should be appreciated that the monochromatic camera 110 may obtain the frames 405 and 410 sequentially, where each subsequent frame captures a pixelated image representation of the vehicle 105 as it traverses the field of view 120.

The encoder 415 may decode the monochromatic image and pass the decoded image to a digital decoder 420, which may transmit the signal to the predicted optical flow block 425. The reconstruct frame K block 430 may receive the previous frame K−1 410, and the predicted optical flow feed from the block 425, and provide the reconstructed frame to the compute reconstruction block 435. The compute reconstruction block 435 may further receive the frame K, in conjunction with the reconstruct frame K, and provide output for back propagation.

Figure 5:
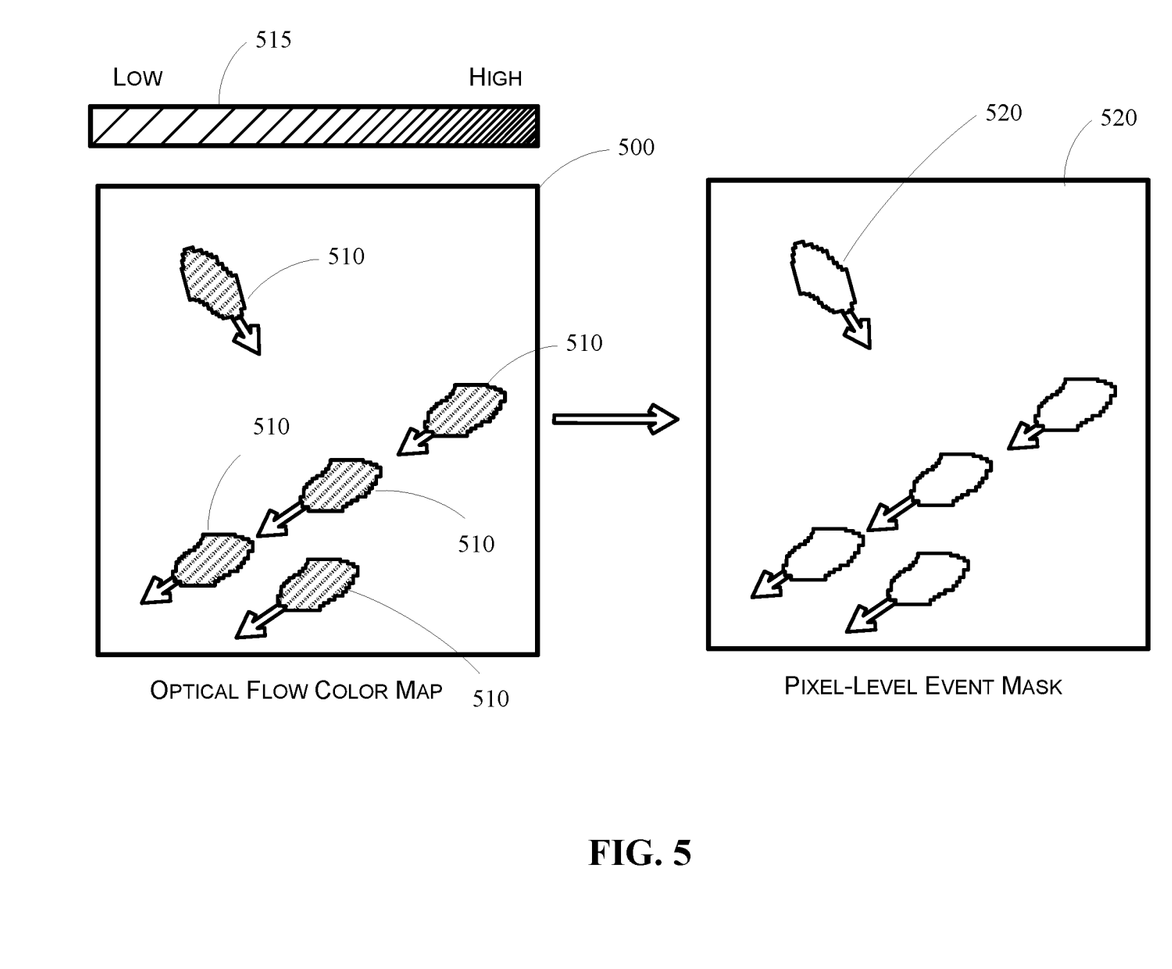
FIG. 5 depicts an optical flow color map and a pixel-level event mask in accordance with the present disclosure.

FIG. 5 depicts an optical flow map 500 (which may be an output of the predicted optical flow map as illustrated in block 435) and a pixel-level event mask 520, in accordance with the present disclosure. The optical flow color map 500 illustrates a plurality of red-green-blue (RGB) patches 510 that may be associated with one or more vehicles that have moved into and/or through the field of view 120 of the monochromatic camera 110. The optical flow map 500 comprises an RGB patch 510, the RGB patch having color information associated with a velocity for the moving vehicle 105. The system 300 may generate a birds-eye-view projection based on the pixel-level event mask 520. Although illustrated without color, it should be appreciated that the optical flow color map 500 may be encoded such that one or more RGB patches 510 include a color associated with a relative speed for that particular RGB patch that can vary from low to high (as shown in the speed map 515).

In one aspect, the system 300 may detect, via the processor(s) 305, and based on the monochromatic image (e.g., frame 430 and frame K−1), an event patch 510 comprising a plurality of pixels associated with the moving vehicle 105. The system 300 may threshold the optical flow map 500 to create the pixel-level event mask 520 by extracting the RGB patches within each event mask. The system 300 may convert the event mask to a well-calibrated birds-eye view projection space, where the pixel to x, y, z conversion is accurately known. This calibration needs to be done once, and can be done by placing 4 ArUco markers on the floor and mapping their coordinates onto the birds-eye view projection space. The system 300 may then resize the birds-eye view projection in the optical flow color map 500 to a predetermined size (e.g., 256 px×256 px) and generate the pixel-level event mask 520.

Figure 6:
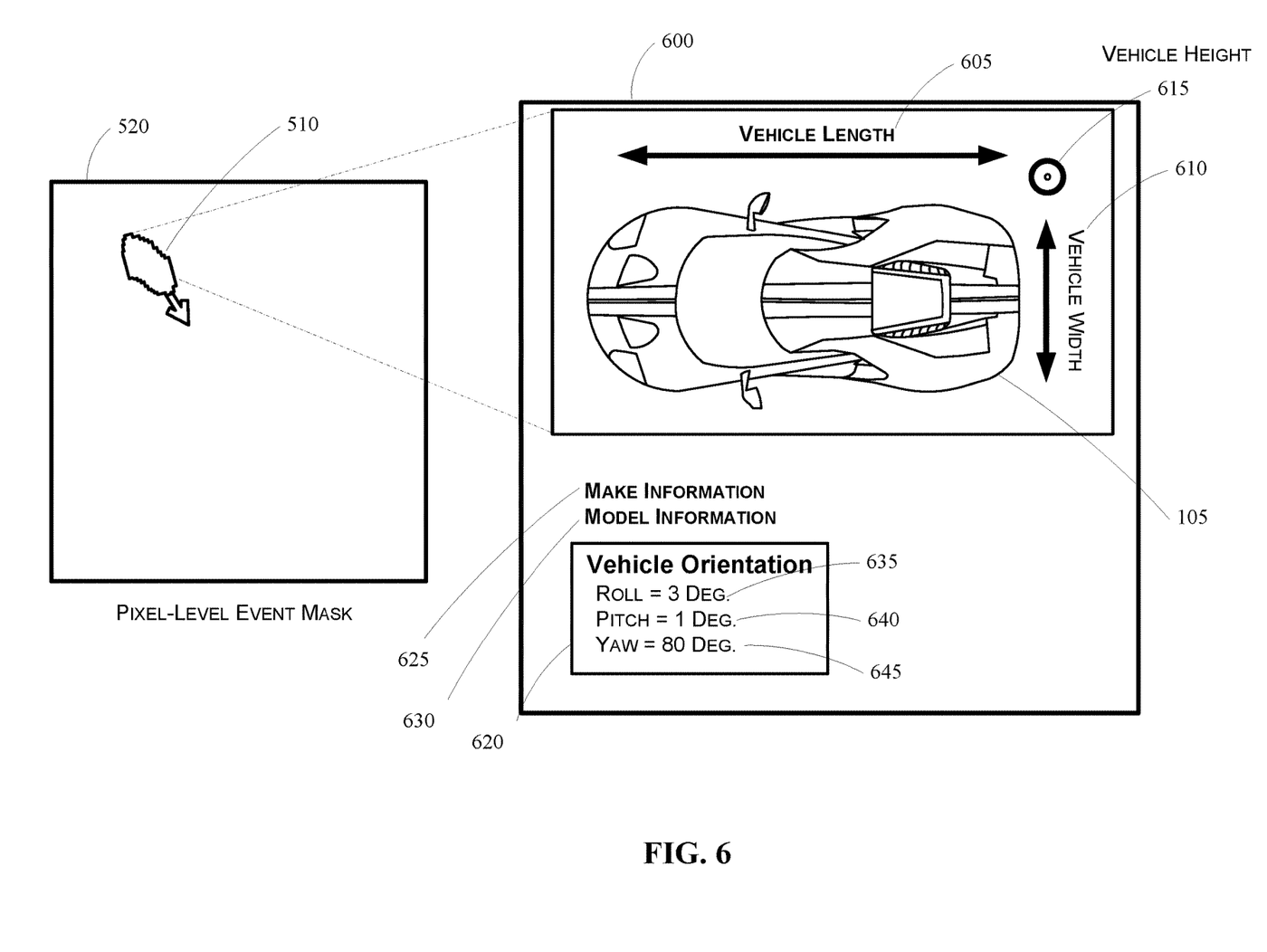
FIG. 6 illustrates an example output of a vehicle model and Roll-Pitch-Yaw (RPY) prediction network in accordance with the present disclosure.

The system 300 may further determine, based on the resized RGB patch 510, and via the unsupervised vehicle model and roll-pitch-yaw (RPY) prediction network 700, vehicle orientation 620, including a linear function 715 for determining a vehicle roll value 635, a vehicle pitch value 640, and a vehicle yaw value 645. FIG. 6 illustrates an example output of a vehicle model and Roll-Pitch-Yaw (RPY) prediction network (e.g., such as the RPY prediction network 700 as shown in FIG. 7) in accordance with the present disclosure.

The vehicle pose 600 can include x, y, z values associated with vehicle orientation for the vehicle 105 as it operates in the field of view 120. For example, the vehicle pose 600 can include a vehicle length value 605, a vehicle width value 610, and vehicle height value 615. Extracting the RGB patch 510 from the pixel-level event mask can include resizing the RGB patch 510 to a target resolution. The system 300 may determine vehicle information including vehicle make information 625, vehicle model information 630, and vehicle orientation information 620 using known object detection and characterization techniques. The vehicle orientation information 620 may include vehicle length value, 605 a vehicle width value 610, a vehicle height value 615, and a vehicle orientation information 620.

Figure 7:
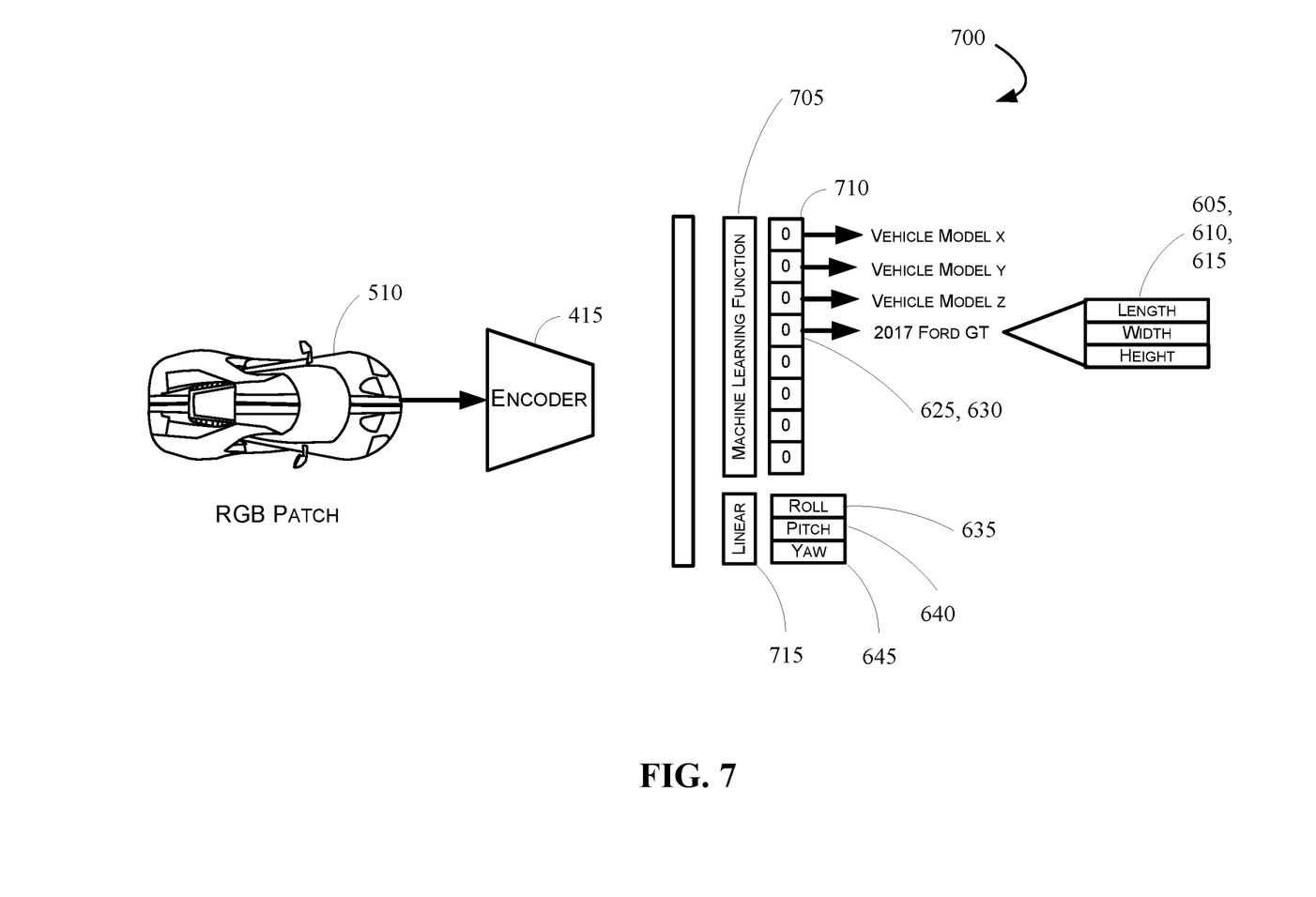
FIG. 7 illustrates an example vehicle RPY prediction network in accordance with the present disclosure.

FIG. 7 illustrates an example vehicle RPY prediction network 700 in accordance with the present disclosure. The RPY prediction network 700 may encode the RGB patch 510 via the encoder 415, and decode the RGB patch 510 via a machine learning function 705 having a plurality of stored values 710 for known vehicle make, mode, and dimensional information. According to an embodiment, prior known information about the vehicle model information 630 is used to get information associated with vehicle dimensions (length 605, width 610, height 615). From the birds-eye view (as illustrated in the optical flow color map 500 in FIG. 5), x, y, z, orientation is computed for the centroid of each event patch 510. It is to be noted that the orientation 620 can be obtained from the optical flow map 500 as the mean of pixel direction within the masked region (e.g., the masked region for each blob). Orientation 620 is combined with the yaw 645 predicted by the Vehicle Model and RPY prediction network 700 to obtain robust yaw.

The RPY prediction network 700 utilizes feature detection techniques, which are a low-level image processing operation. That is, it is usually performed as the first operation on an image, and examines every pixel to see if there is a feature present at that pixel. When part of a larger algorithm, then the algorithm will typically only examine the image in the region of the features. As a built-in pre-requisite to feature detection, the input image is usually smoothed by a Gaussian kernel in a scale-space representation and one or several feature images are computed, often expressed in terms of local image derivatives operations. Occasionally, when feature detection is computationally expensive and there are time constraints, a higher-level algorithm may be used to guide the feature detection stage, so that only certain parts of the image are searched for features.

Figure 8:
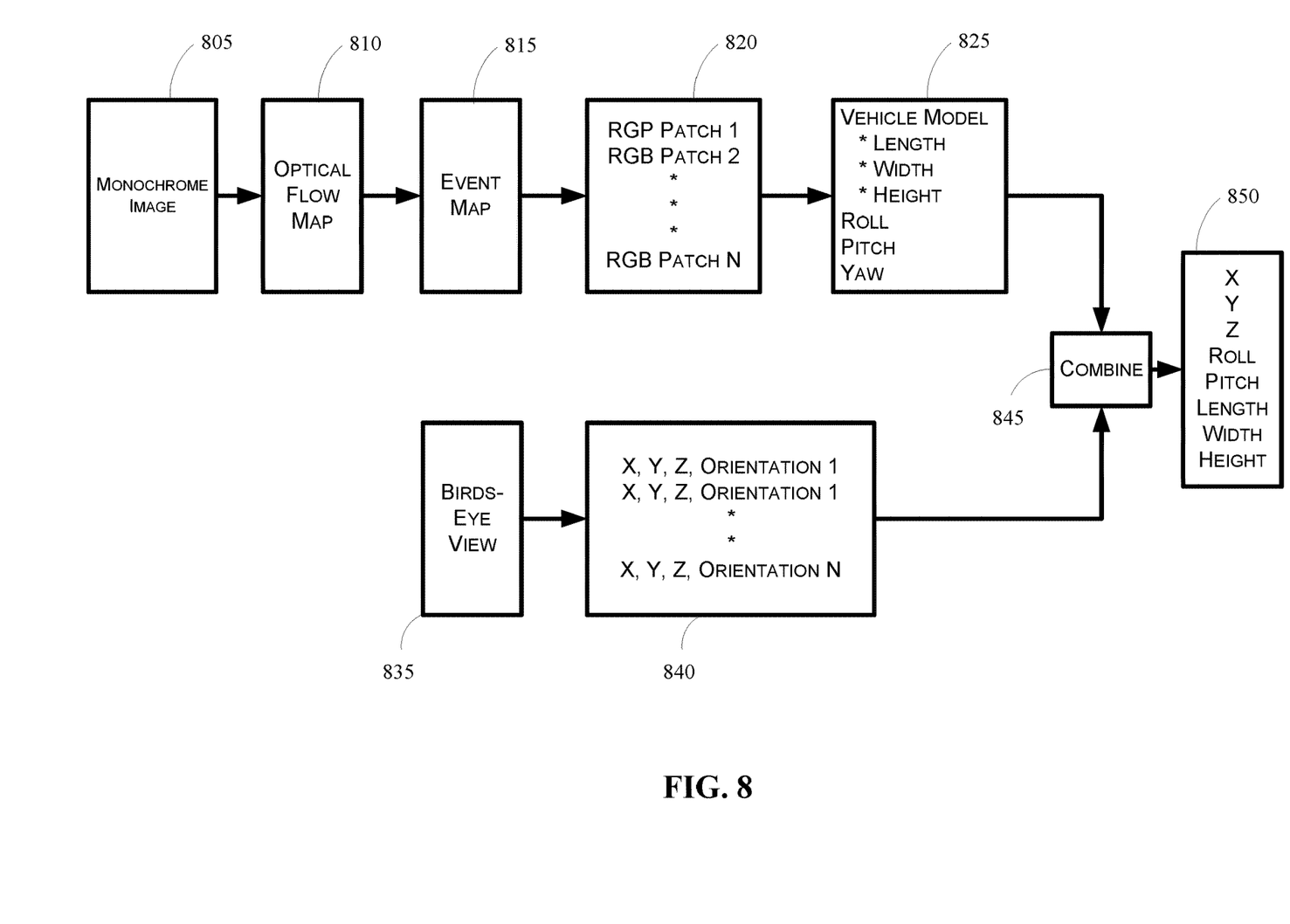
FIG. 8 depicts a functional block diagram of a method for in accordance with the present disclosure.

FIG. 8 depicts a functional block diagram of a method for estimating a vehicle pose for a moving vehicle in accordance with the present disclosure. The system 300 may obtain a plurality of monochromatic images 805, and generate from the plurality of monochromatic images, an optical flow map 810. The system 800 may generate an event map 815, and extracts the RGB patch within each masked region as shown in block 820. The extracted RGB patches or blobs" provide information that can include vehicle shapes, dimensions, and speed at which the vehicle is moving through the field of view.

Blobs provide a complementary description of image structures in terms of regions, as opposed to corners that are more point-like. Nevertheless, blob descriptors may often contain a preferred point (a local maximum of an operator response or a center of gravity) which means that many blob detectors may also be regarded as interest point operators. Blob detectors can detect areas in an image which are too smooth to be detected by a corner detector. The system may determine the make and model of the car from the resized RGB patch having the blob information of interest. The system then determines the vehicle model at block 825, references vehicle dimensional information, and determines a roll, pitch and yaw of the moving vehicle. The bird's eye view 835 from the optical flow map 810 is used to determine vehicle x, y, z orientation at block 840, which is then combined at block 845 with the vehicle dimensional information and roll, pitch, and yaw from the block 825. The system may then output a vehicle pose 850 that includes x, y, z values associated with vehicle orientation, a vehicle length value, a vehicle width value, and vehicle height value.

This method builds an event map using just a mono camera which saves cost by utilizing a monochromatic camera instead of sophisticated LiDAR, RADAR, or RGB cameras to determine vehicle pose. By running a neural network to predict vehicle model, roll, pitch, and yaw only if an event is detected, the system may conserve computational energy and time, which may save power resources when the garage is not busy with vehicle traffic. Moreover, the disclosed method utilizes the known car dimension to provide an accurate a 3-dimensional bounding box. Current monochromatic camera-based methods cannot provide an accurate bounding box in world coordinates, which is imperative for routing a car in a tight garage-like space for applications such as terminal traffic control. Model trained on RGB patches of cars in different orientations combined with pose extraction from a well-calibrated birds-eye view of an event map provides an accurate roll, pitch, and yaw estimation.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for estimating a vehicle pose for a moving vehicle comprising:
    obtaining, via a processor disposed in communication with a monochromatic camera, a monochromatic image of an operating environment;
    detecting, via the processor and based on the monochromatic image, an event patch comprising a plurality of pixels associated with the moving vehicle;
    generating, via an unsupervised optical flow prediction network, an optical flow map to predict an optical flow for each pixel in the monochromatic image;
    generating, based on the optical flow map, a pixel-level event mask comprising a Red-Green-Blue (RGB) patch; and
    estimating the vehicle pose for the moving vehicle associated with the RGB patch.

2. The method according to claim 1, wherein the optical flow map comprises the RGB patch, the RGB patch having color information associated with a velocity for the moving vehicle.

3. The method according to claim 1, wherein generating the optical flow map comprises:
    thresholding the optical flow map to create the pixel-level event mask comprising the RGB patch; and
    generating a birds-eye-view projection based on the pixel-level event mask.

4. The method according to claim 1, wherein the vehicle pose comprises:
    x, y, z values associated with vehicle orientation, a vehicle length value, a vehicle width value, and vehicle height value.

5. The method according to claim 1, wherein estimating the vehicle pose comprises:
    extracting the RGB patch from the pixel-level event mask
    resizing the RGB patch to a target resolution; and
    determining, based on the resized RGB patch, and via an unsupervised vehicle model and roll-pitch-yaw (RPY) prediction network, vehicle make, vehicle model, a vehicle length value, a vehicle width value, a vehicle height value, and a vehicle orientation.

6. The method according to claim 5, wherein the vehicle orientation further comprises a vehicle roll value, a vehicle pitch value, a vehicle yaw value.

7. The method according to claim 1, further comprising estimating the vehicle pose for a plurality of vehicles based on the monochromatic image.

8. A system, comprising:
    a processor; and
    a memory for storing executable instructions, the processor programmed to execute the instructions to:
    obtain, via the processor disposed in communication with a monochromatic camera, a monochromatic image of an operating environment;
    detect, via the processor and based on the monochromatic image, an event patch comprising a plurality of pixels associated with a moving vehicle in the operating environment;
    generate, via an unsupervised optical flow prediction network, an optical flow map to predict an optical flow for each pixel in the monochromatic image;
    generate, based on the optical flow map, a pixel-level event mask comprising a Red-Green-Blue (RGB) patch; and
    estimate a vehicle pose for the moving vehicle associated with the RGB patch.

9. The system according to claim 8, wherein the optical flow map comprises the RGB patch, the RGB patch having color information associated with a velocity for the moving vehicle.

10. The system according to claim 8, wherein the processor is further programmed to generate the optical flow map by executing the instructions to:
    threshold the optical flow map to create the pixel-level event mask comprising the RGB patch; and
    generate a birds-eye-view projection based on the pixel-level event mask.

11. The system according to claim 8, wherein the vehicle pose comprises:
    x, y, z values associated with vehicle orientation, a vehicle length value, a vehicle width value, and vehicle height value.

12. The system according to claim 8, wherein the processor is further programmed to estimate the vehicle pose by executing the instructions to:
    resize the RGB patch to a target resolution; and
    determine, based on the resized RGB patch, and via an unsupervised vehicle model and roll-pitch-yaw (RPY) prediction network, a vehicle make, vehicle model, a vehicle length, vehicle width, vehicle height, and a vehicle orientation.

13. The system according to claim 8, wherein vehicle orientation further comprises a vehicle roll value, a vehicle pitch value, a vehicle yaw value.

14. The system according to claim 8, wherein the processor is further programmed to execute the instructions to estimate the vehicle pose for a plurality of vehicles based on the monochromatic image.

15. A non-transitory computer-readable storage medium having instructions stored thereupon which, when executed by a processor, cause the processor to:
    obtain, via the processor disposed in communication with a monochromatic camera, a monochromatic image of an operating environment;

detect, via the processor and based on the monochromatic image, an event patch comprising a plurality of pixels associated with a moving vehicle in the operating environment;

generate, via an unsupervised optical flow prediction network, an optical flow map to predict an optical flow for each pixel in the monochromatic image;

generate, based on the optical flow map, a pixel-level event mask comprising a Red-Green-Blue (RGB) patch; and estimate the vehicle pose for the moving vehicle associated with the RGB patch.

16. The non-transitory computer-readable storage medium according to claim 15, wherein the optical flow map comprises the RGB patch, the RGB patch having color information associated with a velocity for the moving vehicle.

17. The non-transitory computer-readable storage medium according to claim 15, having further instructions stored thereupon to:

threshold the optical flow map to create the pixel-level event mask comprising the RGB patch; and generate a birds-eye-view projection based on the pixel-level event mask.

18. The non-transitory computer-readable storage medium according to claim 15, wherein the vehicle pose comprises:

x, y, z values associated with vehicle orientation, a vehicle length value, a vehicle width value, and vehicle height value.

19. The non-transitory computer-readable storage medium according to claim 15, having further instructions stored thereupon to:

resize the RGB patch to a target resolution; and determine, based on the resized RGB patch, and via an unsupervised vehicle model and roll-pitch-yaw (RPY) prediction network, a vehicle make, vehicle model, a vehicle length, vehicle width, vehicle height, and a vehicle orientation.

20. The non-transitory computer-readable storage medium according to claim 15, wherein vehicle orientation further comprises a vehicle roll value, a vehicle pitch value, a vehicle yaw value.

\* \* \* \* \*